United States Patent
Hodde et al.

(10) Patent No.: US 9,963,304 B2
(45) Date of Patent: May 8, 2018

(54) METHOD AND DEVICE FOR SUPPLYING ROLLABLE DISCOIDAL COMPONENTS

(71) Applicant: Kolbus GmbH & Co. KG, Rahden (DE)

(72) Inventors: Sven Hodde, Osnabruck (DE); Leonid Ugorets, Rahden (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days. days.

(21) Appl. No.: 15/373,552

(22) Filed: Dec. 9, 2016

(65) Prior Publication Data

US 2017/0166408 A1    Jun. 15, 2017

(30) Foreign Application Priority Data

Dec. 10, 2015    (DE) .......................... 10 2015 015 992

(51) Int. Cl.

| | | |
|---|---|---|
| *B65G 59/04* | (2006.01) | |
| *B65H 3/08* | (2006.01) | |
| *G07F 11/10* | (2006.01) | |
| *B65H 3/16* | (2006.01) | |
| *B65G 47/92* | (2006.01) | |
| *B65G 11/02* | (2006.01) | |
| *B65G 47/88* | (2006.01) | |
| *B65G 47/91* | (2006.01) | |

(52) U.S. Cl.
CPC ............ *B65G 47/92* (2013.01); *B65G 11/023* (2013.01); *B65G 47/8838* (2013.01); *B65G 47/912* (2013.01)

(58) Field of Classification Search
CPC .. B65G 47/92; B65G 11/023; B65G 47/8838; B65G 47/912
USPC .................................. 221/212, 171; 335/284
See application file for complete search history.

(56) References Cited

U.S. PATENT DOCUMENTS

| | | | | |
|---|---|---|---|---|
| 3,645,377 A | * | 2/1972 | Zheigur .................... | B07C 5/02 198/381 |
| 3,661,241 A | * | 5/1972 | Ioffe ..................... | B65G 47/244 198/381 |
| 3,930,212 A | * | 12/1975 | Ioffe ...................... | B65G 47/24 198/381 |
| 4,113,142 A | * | 9/1978 | Ryzhov .................. | B65G 47/26 198/381 |
| 4,153,151 A | * | 5/1979 | Kulberg ............. | B65G 47/1407 198/381 |
| 4,801,044 A | * | 1/1989 | Kubota .............. | B65G 47/1407 221/163 |
| 5,291,645 A | * | 3/1994 | Aoyama ................ | B23P 19/006 29/240 |
| 5,392,954 A | * | 2/1995 | Gartz ........................ | B21J 15/32 221/161 |
| 5,477,982 A | * | 12/1995 | Aoyama ............... | B23P 19/006 221/266 |

(Continued)

FOREIGN PATENT DOCUMENTS

| | | | |
|---|---|---|---|
| JP | 2000133991 | * | 8/1999 |
| JP | 11348917 A | * | 12/1999 |

*Primary Examiner* — Rakesh Kumar
(74) *Attorney, Agent, or Firm* — Alix, Yale & Ristas, LLP

(57) ABSTRACT

A method and a device for individually supplying rollable discoidal components stocked in a reservoir in a supply position, wherein one component is respectively held in the supply position with the aid of a magnetic field of the device.

18 Claims, 2 Drawing Sheets

(56) References Cited

U.S. PATENT DOCUMENTS

| | | | | |
|---|---|---|---|---|
| 5,501,317 A | * | 3/1996 | Sommer | B65G 54/02 198/464.2 |
| 2002/0000360 A1 | * | 1/2002 | Saito | B65G 47/1471 198/396 |
| 2017/0166408 A1 | * | 6/2017 | Hodde | B65G 47/92 |

* cited by examiner

METHOD AND DEVICE FOR SUPPLYING ROLLABLE DISCOIDAL COMPONENTS

BACKGROUND

The present invention pertains to a method for supplying rollable discoidal components as well as to a device for supplying rollable discoidal components.

Known systems for individually supplying rollable discoidal components in a predefined position comprise devices that initially arrange the components from a disordered stock in single-layer rows, from which the individual components are then separated and supplied. For this purpose, such systems comprise guide elements that define the orientation and the position of the separated components to be supplied, but at the same time also restrict access to the component in its supply position. This in turn requires multidimensional motions for transferring the components from their supply position onto or into an intermediate product incorporating the respective component.

SUMMARY

The present disclosure is therefore based on the objective of developing a method that is enhanced in comparison with the prior art, as well as a device that eliminates at least one of the disadvantages of the prior art.

The method and associated device rely on the use of magnetizable discoidal components that are magnetized and magnetically held and preferably reoriented in the supply position.

The method and associated device are disclosed as comprising feeding the single-layer row of discoidal components individually through a feed outlet opening that faces a separating device, whereby the respective component located in the outlet opening has its end faces oriented parallel to a feed direction, in which the components exit the outlet opening; and in the separating device, generating a magnetic field to hold the respective component in the supply position after the respective component has completely exited from the outlet opening. The component exits the outlet opening in one planar orientation and is rotated and held in its supply position by the magnetic field in another planar orientation that is angled relative to the one planar orientation.

According to a more complete disclosure of the system, a reservoir is provided, in which the rollable discoidal components are stocked. These components respectively feature two essentially plane and parallel end faces and a lateral area arranged between these end faces. In order to simplify the supply, the components may be stocked in disordered form, e.g., in a drum conveyor that comprises a sorting device in order to respectively form a single-layer row of rollable discoidal components from a partial quantity of the disordered stock.

A feed device connected to the reservoir feeds the single-layer row of components to a supply position and thereby allows an arrangement of the reservoir and particularly its supply opening, which is largely independent of the supply position. If the reservoir is arranged above the supply position, the feed device may due to the rollability of the components be realized in the form of a simple guide and particularly require no driven transport means.

In addition, a separating device is provided and prevents several components of the single-layer row from being simultaneously located in the supply position. The rollable discoidal components are made of magnetizable material such that they can be subjected to a force in a magnetic field, particularly such that one of the components, which has completely exited the feed device, respectively is at least temporarily held in the supply position by a magnetic field of the device. In this way, the component can be held in its supply position without mechanically acting elements such that access to the component is not impaired. The magnetic field furthermore promotes the feed of the components into the supply position and thereby enhances the functional reliability of the device. In order to generate this magnetic field, the device comprises at least one magnet that may be formed by an electromagnet and/or a permanent magnet.

A limit stop is preferably provided opposite of the outlet opening of the feed device, through which the components exit into the supply position, in order to define the supply position in the feed direction of the components, wherein the respective component exiting the feed device contacts said limit stop. Since the supply position is thereby mechanically defined on one side, the requirements with respect to the magnetic field for holding the supplied component can be significantly reduced without affecting the positioning accuracy of the component.

It is advantageous to utilize an inhomogeneous magnetic field, in which the spatial variation of the magnetic flux density differs in different directions. In this context, a distinctly different spatial variation of the flux density in the directions extending orthogonal to the supply direction of the components from the feed device is particularly advantageous. Components that have completely exited the outlet opening of the feed device are thereby always aligned in such a way that the surface normal of their end faces is oriented parallel to the direction of the greatest variation of the magnetic flux density. Consequently, the orientation of the components in the supply position is not dependent on the orientation of the outlet opening because the components are respectively aligned in the desired fashion due to the magnetic field only such that additional options with respect to the constructive design of the feed device and particularly its outlet opening can be considered.

However, the outlet opening is preferably turned relative to the orientation of the components in their supply position about the feed direction such that each component rotates about the feed direction in accordance with the magnetic field immediately after it exits the outlet opening. This rotation also reliably prevents the undesired simultaneous supply of several very thin components in layered form without impairing access to the supply position by additional guides. In addition, the distance between the outlet opening on the one hand and the limit stop defining the supply position in the feed direction on the other hand only has to be approximately adapted to the size of the components. In this case, the separation of the components from the single-layer row is realized by the respective component to be separated itself due to its rotation about the feed direction. In order to ensure maximum functional reliability of this separation, the components should be rotated by 90° and the outlet opening therefore should be oriented orthogonally to the alignment of the components in the supply position.

The rollable discoidal component located in the supply position advantageously has a first common contact surface with the following component, wherein the rotational axis of the rotation of the component into the supply position, which is generated by the magnetic field, extends through this first contact surface. Since the flux of the magnetic field also extends through this contact surface, the rotational axis of the component is additionally stabilized such that the functional reliability is also enhanced.

The outlet opening is advantageously adapted to the thickness of the components such that the components are prevented from rotating or tilting about the feed direction as long as the respective component has not completely exited the feed device without thereby impairing the feed within the feed device.

The magnetic field is advantageously generated such that it causes the component to be centered in the supply position by rolling against the limit stop. For this purpose, the magnet of the device is simply composed of a stack of individual layered magnets with different dimensions. In this context, it proved particularly advantageous to layer elongate magnetic elements that cause the rotation of the components about their feed direction and square or round magnetic elements that cause the centering of the components in their supply position, wherein the narrow edge of the elongate magnetic elements respectively corresponds approximately to the diameter of the round magnetic elements and the edge length of the square magnetic elements. In this way, the proposed magnetic field can be generated exclusively with commercially available permanent magnets such that a simple and cost-effective construction is achieved.

The distance of the limit stop defining the supply position from the outlet opening of the feed device is greater than the diameter of the components to be supplied and smaller than twice this diameter. The device advantageously comprises an adjusting device, by means of which this distance can be varied in order to adapt the device to different sizes of rollable discoidal components or to easily change the supply position in accordance with the magnitude of the components.

In order to equip intermediate products with rollable discoidal components, the thusly supplied components are subsequently transferred from the supply position to a delivery position on or in the intermediate product, wherein a transfer device is provided for this purpose.

This transfer device comprises a slide that takes hold of the component in the supply position, transfers the component to the delivery position and ultimately releases the component in this delivery position. The motion path of this slide advantageously extends from a starting position to an end position corresponding to the delivery position of the component, wherein the slide moves through the supply position of the component along this motion path. In this way, a particularly time-saving linear motion of the slide and therefore a high capacity of the device can be achieved. The device operates in a particularly efficient fashion if the supply position is arranged a short distance above the delivery position such that the distance to be traveled is very short and the component remains in its delivery position due to its weight only without another change in position. The slide itself closes the outlet opening of the feed device as soon as it arrives in the supply position from its starting position and until it once again passes the supply position during the return into its starting position. This makes it possible to eliminate an additional mechanism for preventing following components in the feed device from inadvertently exiting the outlet opening.

The functional reliability of the transfer device is additionally enhanced with a suction element arranged in the slide, wherein said suction element is preferably acted upon with a vacuum when the slide contacts the component located in its supply position and at atmospheric pressure or acted upon with compressed air when the component has reached its delivery position.

BRIEF DESCRIPTION OF THE DRAWING

An exemplary embodiment of the inventive method, as well as of the inventive device, is described in greater detail below with reference to the drawing, in which.

DETAILED DESCRIPTION

Figure 1:
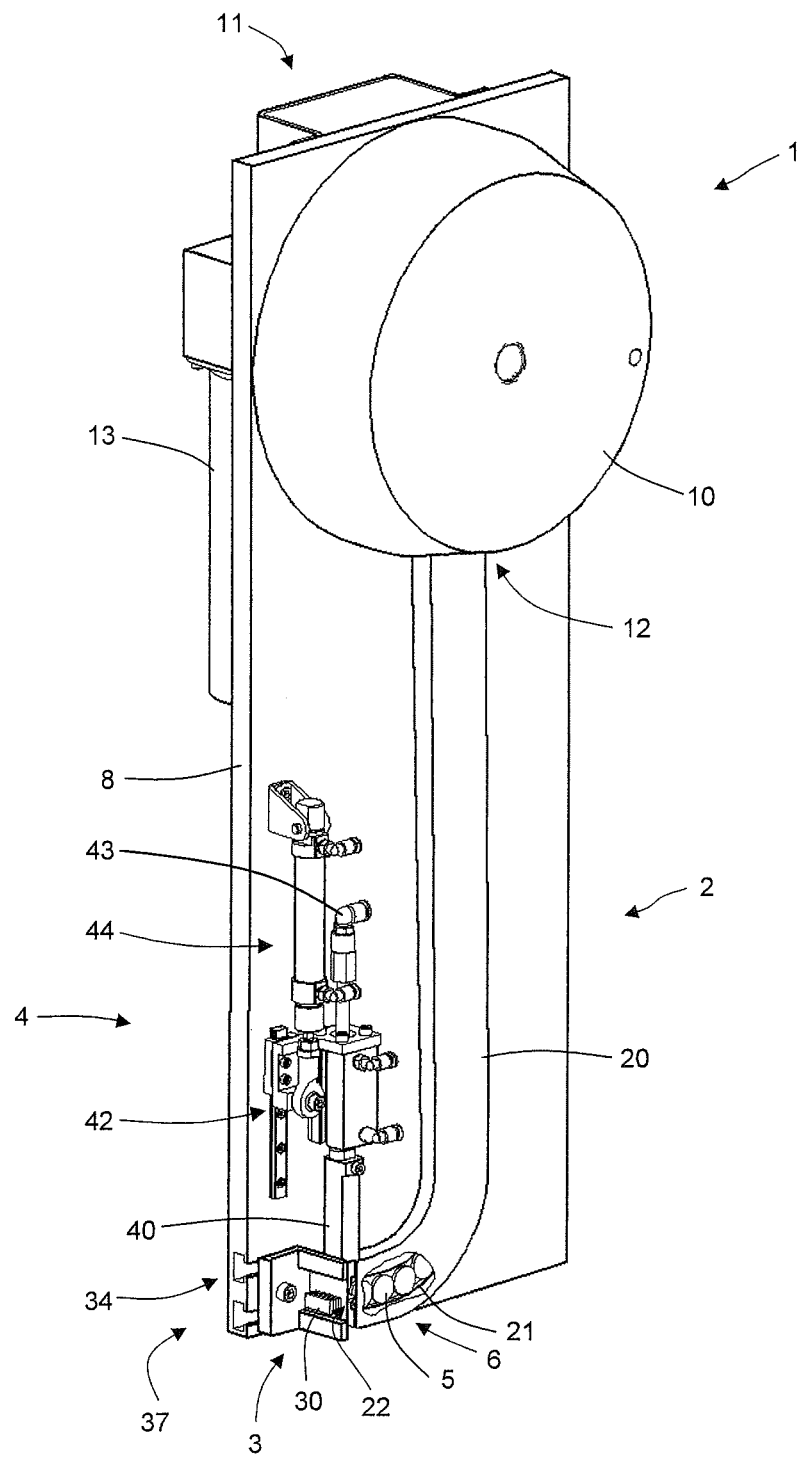
FIG. 1 shows a perspective representation of a device for supplying rollable discoidal components, as well as for equipping intermediate products with such components.

The device illustrated in FIG. 1 is assembled on a pedestal in the form of a base plate 8 and thereby forms a compact unit can be used in different machines. The disordered reservoir is realized in the form of a drum conveyor 1 and filled with rollable discoidal components 5 through a filling orifice 11. This reservoir can be selectively filled with rollable discoidal components stored in a large container manually or automatically by means of a not-shown device. The drum 10 of the drum conveyor serves as reservoir and is set in rotation by means of a drive 13. In the region of its outlet opening 12, the interior of the drum 10 features guide elements that arrange the disordered components 5 in a single-layer row 6 in conjunction with the rotation of the drum 10, wherein this single-layer row is then transported to a supply position 7 by means of a feed device 2.

The feed device 2 features a guide 21 for accommodating and guiding the single-layer row 6, wherein said guide preserves the order of this row 6 during the transport of the magnetizable components 5 from the drum conveyor 1 to the separating device 3. Viewed in the product flow direction, the guide 21 initially features a vertical section before it ends in a slot-shaped outlet opening 22 with horizontal feed direction 101 via an arcuate section. Due to its length, the feed device can accommodate a plurality of rollable discoidal components 5 and therefore serve as a buffer 20 for compensating brief transport interruptions of the drum conveyor 1. The guide 21 is designed for utilizing the weight and the rollability of the components 5 in that these components roll on their lateral areas 105 in the arcuate section and the outlet opening 22, through which they exit the feed device 2 in an upright position, in which the normal of their end faces 104 is oriented orthogonally to the feed direction 101 and horizontally.

Figure 2:
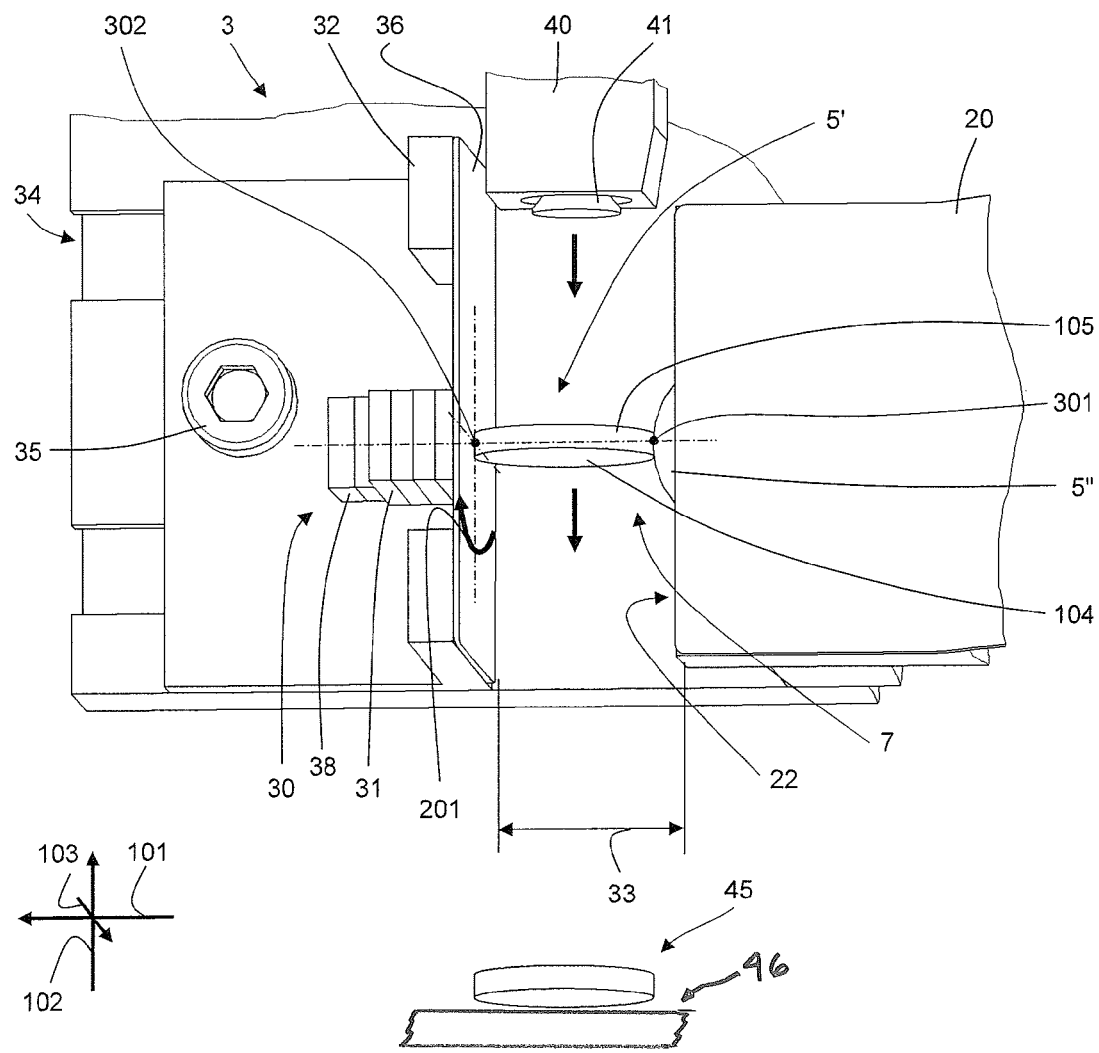
FIG. 2 shows a perspective representation of a detail of a device for supplying rollable discoidal components.

According to FIG. 2, a limit stop 36 of the separating device 3 is arranged at a certain distance from the outlet opening 22 of the feed device 2 referred to the feed direction 101. This distance 33 is chosen slightly larger than the diameter of the components 5 such that only one individual component 5 is respectively located in the supply position 7 formed between the outlet opening 22 of the feed device 2 and the limit stop 36 of the separating device 3.

The limit stop 36 is realized in the form of a metal sheet, wherein the magnet 30 is arranged on the side of this metal sheet that faces away from the supply position 7. This magnet is composed of a stack of layered permanent magnets 31, 38, the poles of which are arranged alternately referred to the feed direction 101. The stack consists of differently dimensioned individual magnets, wherein a first rectangular shape has an aspect ratio that significantly deviates from 1. These individual elongate magnets 31 are aligned horizontally with their long sides and form the part of the magnet 30 facing the supply position. In this way, the magnetic field being generated aligns the component 5 horizontally. The component 5 rolling out of the outlet opening 22 in an upright position is rotated by the angle 201 by means of the active magnetic field only, wherein the rotation takes place about the feed direction 101. According to the arrangement of the outlet opening 22 and the individual elongate magnets 31 illustrated in FIG. 2, the angle of rotation 201 amounts to 90°. In this case, the rotating direction may vary and is irrelevant.

The part of the magnet 30 facing away from the supply position 7 is composed of a stack of individual square magnets 38. The square magnets are centrally arranged on the individual elongate magnets 31 and their edge length corresponds to the narrow side of the individual elongate magnets 31. The individual square magnets 38 intensify the centering effect of the magnetic field, to which the component 5' is subjected in the supply position 7.

The component 5', which is held in the supply position 7 in this fashion, blocks the outlet opening 22 for the following components 5" of the single-layer row 6 in the feed device 2. The orthogonal relative alignment between the two components 5', 5" is illustrated in FIG. 2, the first of which is located in the supply position 7, and reliably prevents the following components 5" from laterally sliding off and therefore the uncontrollable stacking of components 5 in the supply position 7.

The component 5' located in the supply position 7 has a first common contact surface 301 with its following component 5" and a second common contact surface 302 with the limit stop 36 of the separating device 3. The magnetic flux through these two contact surfaces 301, 302 stabilizes the rotational axis the component 5' and thereby contributes to an exactly reproducible and precise positioning of the component 5' in the supply position 7.

The effect of the magnetic field is further explained, in that the magnetic field extends to buffer 20 and therefore also acts on component 5". However, component 5" cannot move forward because supply position 7 is still occupied by component 5' and component 5" cannot rotate because of guide 21.

As soon as supply position 7 is free (component 5' is removed and slide 40 is retracted) component 5" will immediately pass the outlet opening 22 as it is attracted by the magnet 30 and becomes the next positioned component 5'. The magnetic force is strong enough for holding component 5' and for preventing this component from dropping. The remaining components 5" do not need to push.

The invention would alternatively operate with a horizontal buffer, as long as all the components 5" have contact with their neighbors. A vertical buffer 20 as shown in FIG. 1 supports the magnet array 30 by pushing component 5' with components 5". In addition the buffer 20 as shown ensures all components 5" and 5' have contact to their neighbors.

As soon as component 5' exits guide 21 at 22, component 5' is no longer prevented from rotating and therefore immediately rotates to a horizontal orientation by force of the magnet array 30. The magnetic field acts on component 5" and tries to bring it into the position and orientation of component 5' shown in the figures. This is supply position 7. But component 5" still is blocked by component 5' as it occupies supply position 7 and by guide 21.

In order to change the supply position 7 and to adapt the distance 33 of the limit stop 36 from the outlet opening 22 to the diameter of the components 5, the limit stop 36 and the magnet 30 are jointly connected to an adjusting device 37 by means of a holder 32. The adjusting device shown comprises a linear guide 34 and a clamping mechanism 35 in order to fix the position of the limit stop 36. Alternatively, a not-shown spindle drive may be supplemented for particularly precise adjustments.

A transfer device 4 is arranged above the supply position 7 and on the common base plate 8, wherein said transfer device takes hold of the component 5 located in the supply position 7 and transfers this component to a delivery position 45. This delivery position 45 is located underneath the supply position 7 on or in an intermediate product 46 (shown schematically) incorporating the component such as, e.g., a box cover prepared for a magnetic lock.

The transfer device 4 comprises a slide 40 that can be linearly moved by means of a linear guide 42. A suction element 41 is arranged in the side of the slide 40 that faces the supply position 7 in FIG. 2, wherein said suction element is connected to a not-shown vacuum generator by means of a suction pipe 43. The suction element 41 serves for securely fixing the component 5 on the slide 40 during the transfer from the supply position 7 to the delivery position 45.

Starting from its upper end position, the slide 40 linearly moves through the supply position 7 and takes hold of the supplied component 5 with the aid of the suction element 41 during this process, wherein the slide subsequently pushes the component 5 from the supply position 7 to the delivery position 45 against the active magnetic force. After releasing the component 5 in the delivery position, the slide 40 once again returns into its starting position via the supply position 7. The slide 40 is realized in a column-shaped fashion, wherein its length is dimensioned such that it still blocks the supply position 7 in its lower end position and thereby prevents the row 6 from being fed through the outlet opening 22 until it has reached a position above the supply position 7.

The slide 40 is actuated by means of a drive 44 consisting of two serially connected pneumatic cylinders. In this case, a first cylinder displaces the slide from its upper end position up to the supply position 7 such that the suction element 41 is securely attached to the component 5. As soon as the component 5 is fixed on the suction element 41 due to the vacuum, a second cylinder of the drive 44 displaces the slide 40 into its lower end position and thereby transfers the component 5 to the delivery position 45. It is alternatively also possible to use other not-shown drives that likewise operate in accordance with the two-stage principle or also the single-stage principle.

The invention claimed is:

1. A method for supplying rollable, discoidal components with two plane and parallel end faces and a lateral area arranged between these end faces in a supply position, comprising the steps of:

stocking a plurality of identical, magnetizable, rollable discoidal components in a reservoir;

forming a single-layer row of the stocked components extending in a row direction, whereby the end faces of the components arranged in the single-layer row are oriented parallel to the row direction;

feeding the single-layer row of discoidal components individually through a feed outlet opening that faces a limit stop surface that defines the supply position in a separating device, whereby the respective component located in the outlet opening has its end faces oriented parallel to a feed direction, in which the components exit the outlet opening;

in the separating device, generating a magnetic field that pulls said respective component completely out of the outlet opening into contact with the stop surface at the supply position and holds said respective component in the supply position; and with said magnetic field, rotating said pulled component around an axis of rotation that is parallel to the feed direction and intersects the stop surface.

2. The method according to claim 1, wherein the component exits the outlet opening in one planar orientation and is rotated and held in said supply position by the magnetic field in another planar orientation that is angled relative to said one planar orientation.

3. The method according to claim 1, wherein the rotation is 90°.

4. The method according to claim 2, wherein the effect of the magnetic field generated by the magnet causes the rotation of the component by the angle of rotation after the component exits from the outlet opening while in contact with the next component.

5. The method according to claim 4, wherein the rotation of the component is around an axis of rotation passing through a contact point between the rotated component and the next-in row component, and the generated magnetic field extends through said contact point.

6. The method according to claim 1, wherein after exiting the outlet opening in one planar orientation, the respective component is reoriented by the magnetic field to a different planar orientation before the respective component contacts the stop surface.

7. The method according to claim 1, wherein the magnetic field pulls and rotates the component through the outlet opening and across the supply position until the lateral area abuts against said limit stop, with said limit stop extending in a direction orthogonal to the feed direction, whereby the component is centered in the supply position.

8. The method according to claim 1, including additionally taking hold of a rotated component that is held in said supply position and moving said rotated component from the supply position at the limit stop in a direction that deviates from the feed direction.

9. The method according to claim 8, including that a slider moves said rotated component from the supply position and said slider closes the outlet opening of the feed device during said movement of the rotated component.

10. The method according to claim 1, including guiding the components while the components roll on the component lateral areas in a single-layer row to a vertically elongated outlet opening that faces the supply position, such that the guided components are in lateral contact with each other as said respective component located in the opening exits the outlet opening toward the supply position in a first said feed direction.

11. The method according to claim 10, comprising generating a magnetic flux density that acts upon the component exiting the outlet opening with spatial variation so as to be significantly stronger in a second direction than in a third direction, wherein these two directions are respectively oriented orthogonally to one another and to the feed direction.

12. The method according to claim 11, wherein the second direction is oriented parallel to the end faces of the components when they exit the outlet opening.

13. The method according to claim 12, wherein
the guided components have a diameter; and
each component travels a distance between the outlet opening and the limit stop, which distance is greater than the diameter of the components and smaller than twice the diameter of the components such that no more than one component is completely located between the outlet opening and the limit stop when said one component is rotated and held in the supply position.

14. The method according to claim 10, wherein the generating of a magnetic field comprises generating an electromagnetic field.

15. The method according to claim 10, wherein including mechanically transferring the components from the supply position to a spaced apart delivery position.

16. The method according to claim 15, including holding the component during the transfer from the supply position, while the component moves linearly in a direction extending orthogonally to the feed direction.

17. The method according to claim 16, including applying a suction to the component for holding the component to be transferred.

18. The method according to claim 10, wherein
said magnetic field acts simultaneously upon said component fed to the supply position through the outlet opening of the feed device and on a next component to be fed from the outlet opening;
said magnetic field acts on the component fed to the supply position by rotating and holding said component in said supply position; and
while said component is held in the supply position, said component held in the supply position prevents the next component from moving to the supply position.

* * * * *